(12) United States Patent
Sehgal et al.

(10) Patent No.: US 6,439,849 B1
(45) Date of Patent: Aug. 27, 2002

(54) DUAL TRUNNION HUB-TO-MAST ASSEMBLY

(75) Inventors: Ajay Sehgal, Bedford; Glenn Shimek, Kennedale, both of TX (US)

(73) Assignee: Bell Helicopter Textron, Inc., Hurst, TX (US)

( * ) Notice: Subject to any disclaimer, the term of this patent is extended or adjusted under 35 U.S.C. 154(b) by 0 days.

(21) Appl. No.: 09/848,478

(22) Filed: May 3, 2001

(51) Int. Cl.⁷ ................................................ B64C 27/35
(52) U.S. Cl. ............................. 416/134 A; 416/198 R
(58) Field of Search ................................ 416/124, 126, 416/134 A, 198 R

(56) References Cited

U.S. PATENT DOCUMENTS

| | | | | |
|---|---|---|---|---|
| 2,126,221 A | * | 8/1938 | Sessums ................. | 416/124 X |
| 2,440,956 A | * | 5/1948 | Kearns, Jr. et al. ...... | 416/198 R |
| 2,619,317 A | * | 11/1952 | Traupel .............. | 416/198 R X |
| 2,660,399 A | * | 11/1953 | Robinson et al. ....... | 416/198 R |
| 3,494,708 A | * | 2/1970 | Nunlist et al. ........ | 416/198 R X |
| 3,680,979 A | * | 8/1972 | Hansen et al. .......... | 416/198 R |
| 4,095,322 A | | 6/1978 | Scarpati et al. ............ | 29/156.8 |
| 4,098,559 A | | 7/1978 | Price .......................... | 416/230 |
| 4,316,701 A | | 2/1982 | Scarpati et al. ............. | 416/226 |
| 4,349,316 A | | 9/1982 | Hughes et al. ............... | 416/104 |
| 5,041,182 A | | 8/1991 | Sekiguchi et al. ........... | 156/245 |
| 5,222,297 A | | 6/1993 | Graff et al. ............... | 29/889.71 |
| 5,277,548 A | | 1/1994 | Klein et al. ............. | 416/193 A |
| 5,346,367 A | | 9/1994 | Doolin et al. ............... | 416/230 |
| 5,645,400 A | | 7/1997 | Hunter et al. ........... | 416/134 A |

FOREIGN PATENT DOCUMENTS

| | | | | |
|---|---|---|---|---|
| FR | 759185 | * | 1/1934 | ............. 416/198 R |
| GB | 317469 | * | 7/1929 | ................. 416/244 |
| IT | 327318 | * | 7/1935 | ................. 416/214 |
| IT | 466230 | * | 10/1951 | ............. 416/134 A |

* cited by examiner

*Primary Examiner*—John E. Ryznic
(74) *Attorney, Agent, or Firm*—Gardere Wynne Sewell LLP; Sanford E. Warren, Jr.; Kenneth T. Emanuelson

(57) ABSTRACT

The present invention comprises an apparatus for mounting two or more tail rotor hubs to a tail rotor mast. The apparatus comprises a mast having an externally-splined inboard section shaped and sized to mate with an internal spline on an inboard trunnion. The inboard trunnion is mechanically fixed to the one or more outboard hubs via a torsionally-rigid connection. The outboard portion of the mast is designed to have reduced torsional stiffness, so that torque is transmitted to the outboard trunnions through the inboard trunnion rather than through the mast.

3 Claims, 7 Drawing Sheets

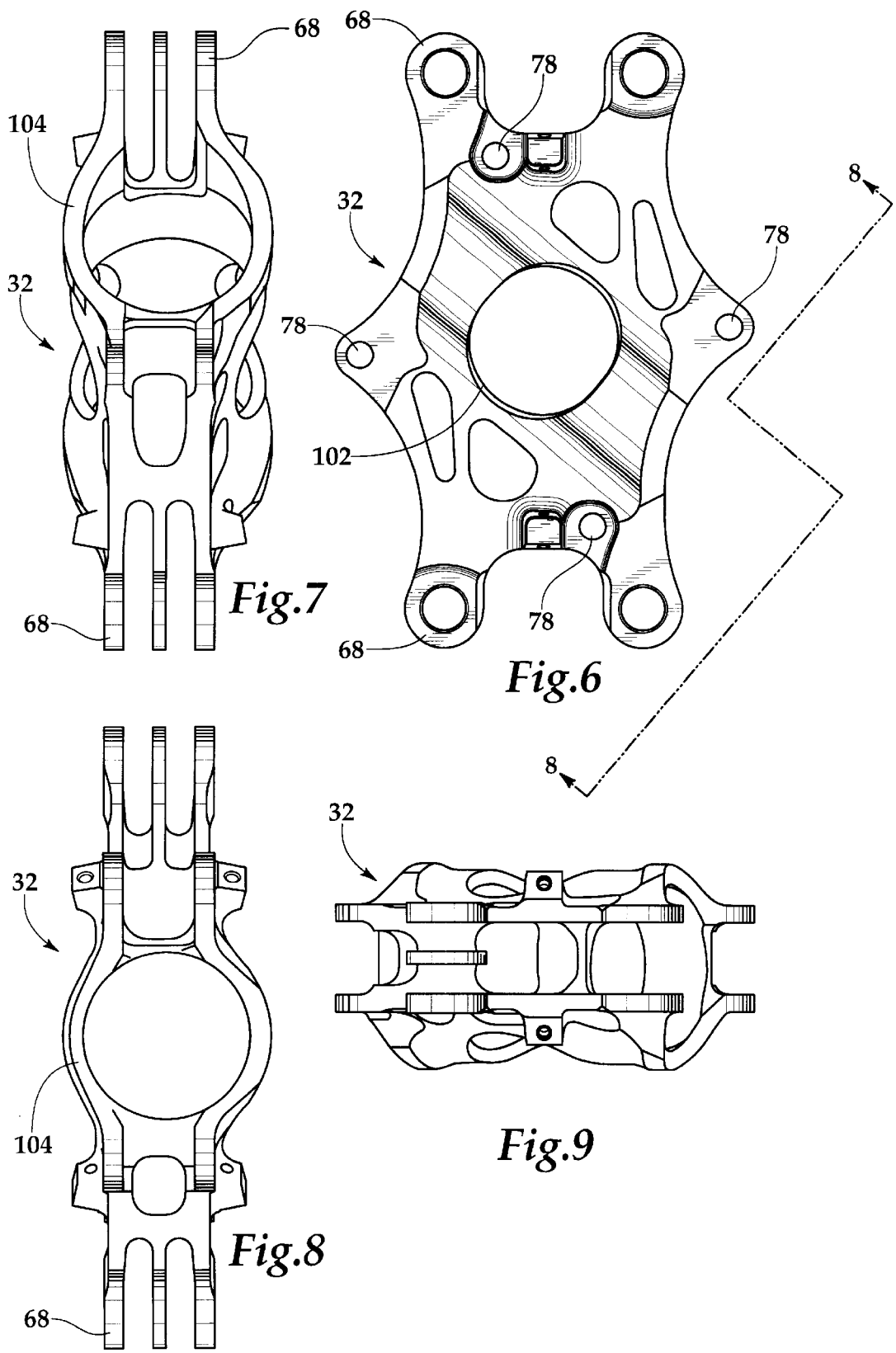

DUAL TRUNNION HUB-TO-MAST ASSEMBLY

TECHNICAL FIELD OF THE INVENTION

The present invention relates generally to the field of aircraft rotors, and in particular to a rotor design for use in a helicopter or similar aircraft.

BACKGROUND OF THE INVENTION

Helicopters generally incorporate at least two rotors into their design. The large rotor providing thrust in the vertical direction is known as the main rotor. In addition to this main rotor, the traditional helicopter design incorporates a tail rotor system to counteract the torque from the main rotor system. Although operable helicopter designs have been produced without the traditional tail rotor geometry, the vast majority of helicopters use this design. The number of blades in the tail rotor itself will depend on the requirements of a particular application.

A significant limitation inherent in the design of prior multi-bladed tail rotors is their inability to satisfactorily accommodate potentially powerful Coriolis torque. A Coriolis torque is generated in a helicopter rotor whenever the rotor plane is tilted relative to the shaft. Since the 1/rev Coriolis torque is proportional to the coning angle, it is usually negligible for most tail rotors. For a two-bladed tail rotor, the 2/rev Coriolis torque is also not a problem because both blades speed up and slow down at the same time, and the drive system is generally sufficiently flexible to provide the necessary torsional freedom. The 2/rev Coriolis torque does, however, become a problem with a multi-bladed rotor if insufficient lead-lag articulation is provided.

Existing multi-bladed tail rotors use a variety of methods to provide the necessary relief for 2/rev Coriolis torque. One design, developed by Sikorsky, uses a fully articulated rotor, complete with lead-lag hinges and dampers. Another design incorporates a flexible spindle at the blade root combined with restricted flapping motion to limit stresses due to Coriolis torque. One design, used by Kaman, allows a small amount of lead-lag motion by using a "rocking pin" arrangement in its flapping hinge. Yet another design, developed by Lockheed, uses a gimbaled tail rotor hub that relieves the 2/rev Coriolis torque in the same manner as a two-bladed teetering rotor.

All of these designs suffer from limitations. In general, each of the above solutions is heavy and complex. Each requires the use of heavily-loaded bearings oscillating at tail rotor frequency, resulting in designs requiring high levels of maintenance and excessive downtime.

Accordingly, there is a need in the art for a tail rotor assembly overcoming the above-described limitations of the prior art designs, including reduction of tail rotor weight and mechanical complexity, reduction or elimination of catastrophic failure modes, and increased service life of the tail rotor mechanisms.

SUMMARY OF THE INVENTION

The following summary of the invention is provided to facilitate an understanding of some of the innovative features unique to the present invention, and is not intended to be a full description. A full appreciation of the various aspects of the invention can be gained by taking the entire specification, claims, drawings, and abstract as a whole.

The present invention relates to a dual-trunnion hub-to-mast assembly that provides improved damage tolerance with extended life expectancy and reduced maintenance burden due to the use of composite and elastomeric materials. In certain embodiments, the assembly is useful as part of a tail rotor assembly consisting of two stacked two-bladed teetering rotors, mounted on a single output shaft.

The present invention makes use of a variety of novel features to overcome the inherent limitations of the prior art. In certain embodiments, the present invention achieves increased-service life of the tail rotor mechanisms. In certain embodiments, the present invention achieves a reduction or elimination of catastrophic failure modes by the incorporation of redundant load paths within the rotor structure. In certain embodiments, the tail rotor of the present invention may be employed in a "pusher" implementation for improved aerodynamic performance by minimizing vertical fin blockage effects.

In addition to the above advantages, in certain embodiments the teachings of the present invention may provide improved aerodynamic efficiency, higher maneuvering capability, improved mechanical flaw tolerance design, and extended life expectancy. In certain embodiments, the present invention allows for reduced maintenance due to the use of composites and elastomerics. In one embodiment, a tail rotor constructed according to the present invention has been designed to achieve a minimum life of 10,000 hours of severe duty use in ground-air-ground maneuvers, air combat maneuvers, and high cycle vibratory loads, with little or no maintenance.

In certain embodiments, the present invention makes extensive use of multiple primary load paths in order to provide a fail-safe structure. In certain embodiments, the present invention provides redundant load paths for critical metal parts to minimize catastrophic failure modes. Certain embodiments eliminate the use of the bearings traditionally required to carry the full centrifugal force of the blade while oscillating at tail rotor one-per-revolution. This is done in order to further increase life expectancy, improve reliability, and minimize maintenance. In certain embodiments, the present invention minimizes control washout to the blades due to control system softness.

As described above, a significant limitation inherent in the design of prior multi-bladed tail rotors is their inability to satisfactorily accommodate potentially powerful Coriolis torque. A Coriolis torque is generated in a helicopter rotor whenever the rotor plane is tilted relative to the shaft. Since the 1/rev Coriolis torque is proportional to the coning angle, it is usually negligible for most tail rotors. For a two-bladed tail rotor, the 2/rev Coriolis torque is also not a problem because both blades speed up and slow down at the same time, and the drive system is generally sufficiently flexible to provide the necessary torsional freedom. The 2/rev Coriolis torque does, however, become a problem with a multi-bladed rotor if insufficient lead-lag articulation is provided.

Existing multi-bladed tail rotors use a variety of methods to provide the necessary relief for 2/rev Coriolis torque. One design, developed by Sikorsky, uses a fully articulated rotor, complete with lead-lag hinges and dampers. Another design incorporates a flexible spindle at the blade root combined with restricted flapping motion to limit stresses due to Coriolis torque. Another design, used by Kaman, allows a small amount of lead-lag motion by using a "rocking pin" arrangement in its flapping hinge. Yet another design, developed by Lockheed, uses a gimbaled tail rotor hub that relieves the 2/rev Coriolis torque in the same manner as a two-bladed teetering rotor.

All of these designs suffer from inherent limitations. In general, each of the above solutions is heavy and complex.

Each requires the use of highly-loaded bearings oscillating at tail rotor frequency, resulting in designs requiring high levels of maintenance and excessive downtime.

One manner of addressing this problem is to mount a pair of two-bladed rotors on the same shaft. This arrangement provides a four-bladed tail rotor with the mechanical and structural simplicity of a two-bladed teetering rotor. By using this concept, no bearings are required to oscillate while carrying the full centrifugal force of the blade.

Although this solution partially addresses the above-described problems, it does not inherently provide relief for the 2/rev Coriolis torque. With this design, whenever the tail rotor experiences first harmonic flapping, one pair of blades will be attempting to accelerate at the same instant in time that the other pair of blades is attempting to decelerate. Thus, the two rotors will try to move in the same manner as a pair of scissors, placing considerable stress on the rotor hub components.

In spite of these limitations, variations on this approach have been employed successfully in aircraft. One design uses a double-teetering tail-rotor with coaxial shafts. Aircraft using this design have been successfully flown. Another design uses a double-teetering tail rotor with flexible forks. While both these approaches provide the desired relief for 2/rev Coriolis torque, there are several disadvantages associated with each one. The designs exhibit increased mechanical complexity and a heavier design. In addition, there are problems associated with tailoring the stiffness of critical metal parts, possibly resulting in a degraded structural design and potentially catastrophic failure modes.

The tail rotor of the present invention utilizes a modification of the above approach. In one embodiment of the present invention, each of a pair of two-bladed rotor assemblies is independently mounted on a common drive shaft. Each rotor assembly is a two-bladed teetering rotor. The spanwise axis of the blade-pair units are perpendicular to each other, and are separated axially to provide adequate space for accommodating hub attachment hardware and operational clearance between them.

The 2/rev Coriolis relief for the tail rotor system of the present invention is provided by optimizing the dynamic charactericstics of an existing component in the system rather than by adding additional hardware. The rotor assembly uses an elastomeric bearing to accommodate rotor flapping. Conventional teetering rotors that use elastomeric bearings to provide flapping degree of freedom require the radial stiffness of the bearings to be very high in order to minimize radial deflection under rotor torque. In the design of the present invention, however, the bearing radial stiffness is tailored to provide adequate stiffness to react rotor torque and to provide adequate softness to relieve for 2/rev Coriolis loads. Since the Coriolis relief is provided by tailoring the spring rate of an existing component required to accommodate the "flapping" degree of freedom anyway, the resulting hub assembly provides a much simpler configuration with reduced weight and cost, and higher reliability due to reduction in number of parts.

In one embodiment of the present invention, an inboard trunnion and outboard trunnion are clamped together on a tail rotor mast using a pair of tapered cones, a hub adapter, and a mast nut. The tail rotor mast transmits drive torque to the inboard trunnion by means of a spline section. The inboard trunnion has mating splines on its inside surface to mate with the mast spline section, and curvic teeth on its outboard face to mate with the corresponding teeth on the hub adapter.

A cone set between the inboard trunnion and inboard shoulder of the mast provides positive centering of the inboard trunnion and locks out radial looseness in the spline section. The drive torque is transmitted to the outboard trunnion from the inboard trunnion through a hub adapter having an inboard curvic coupling mating with the inboard trunnion and an outboard curvic coupling mating with the outboard trunnion. A second cone set between the outboard trunnion and the mast nut provides centering of the outboard trunnion.

In certain embodiments, the section of the mast outboard of the inboard trunnion has a reduced outside diameter to produce a torsional stiffness significantly lower than the torsional stiffness of the hub adapter. Thus for any rotational deflection of the outboard trunnion, the mast will rotate an equivalent amount with this rotation occurring in the reduced section of the mast and not at the outboard cone set joint.

In certain embodiments, the cones, trunnions, and hub adapter slide over the tail rotor mast and are sandwiched between an integral shoulder of the mast and the mast nut. The mast nut torque produces an axial pre-load across these components. The axial pre-load generates the desirable frictional clamp up at the outboard cone and counteracts separation force from the curvic coupling joints.

The primary purpose of the hub adapter is to deliver drive torque to the outboard trunnion. The inboard trunnion is splined to the mast. Accordingly, all of the steady drive torque from the mast goes into the inboard trunnion. Approximately half of that torque goes into the inboard rotor through the inboard yoke. The remaining drive torque exits the inboard trunnion, goes through the hub adapter, and into the outboard trunnion, which drives the outboard yoke and outboard blades. It will be noted that the outboard trunnion is not splined to the mast. Therefore the hub adapter sees about one half of the mast torque as a steady load.

The above-described structure provides a number of benefits, including reduced failure due to fretting and wear, the absence of relative motion at the attachment joints, and commonality between the inboard and outboard rotor assemblies. Since the 2/rev Coriolis torque loads between the inboard trunnion and outboard trunnion are reacted by the curvic couplings, and not the tail rotor mast spline section, the potential failure due to fretting is reduced. Since the two stacked rotor trunnions are clamped together through curvic couplings, they are securely fixed to one another via a tight joint, which is desirable for minimizing the fretting and wear common to joints that see high oscillatory loads. The torsionally-soft outboard section of the mast accommodates the angular deflection between the two trunnions with minimal relative motion occurring at the attachment joint surfaces. Finally, this design allows for common inboard and outboard rotor assemblies, which can be assembled, replaced and shipped as individual 2-bladed assemblies.

There are at least two major design considerations in the sizing of the curvic couplings of the hub adapter. First, each of the couplings must be capable of reacting the steady, oscillatory, and limit torque loads imposed by the tail rotor. Second, it is desirable that the axial pre-load across the couplings be high enough to prevent joint separation during operation. The couplings and surrounding hardware (cone sets, mast nut, and mast) must also be capable of carrying the pre-load requirement. The size and pitch of the curvic couplings will, of course, vary from one application to another.

The novel features of the present invention will become apparent to those of skill in the art upon examination of the following detailed description of the invention. It should be understood, however, that the detailed description of the invention and the specific examples presented, while indicating certain embodiments of the present invention, are provided for illustration purposes only because various changes and modifications within the spirit and scope of the invention will become apparent to those of skill in the art from the detailed description of the invention and claims that follow.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

FIGS. 6–9 are principal axis views of a tail rotor yoke according to certain embodiments of the present invention;

DETAILED DESCRIPTION OF THE INVENTION

The embodiments and examples set forth herein are presented to best explain the present invention and its practical application and to thereby enable those skilled in the art to make and utilize the invention. Those skilled in the art, however, will recognize that the description and examples are presented for the purpose of illustration and example only. Other variations and modifications of the present invention will be apparent to those of skill in the art, and it is the intent of the appended claims that such variations and modifications be covered.

The description as set forth is not intended to be exhaustive or to limit the scope of the invention. Many modifications and variations are possible in light of the above teaching without departing from the spirit and scope of the following claims. It is contemplated that the use of the present invention can involve components having different characteristics. It is intended that the scope of the present invention be defined by the claims appended hereto, giving full cognizance to equivalents in all respects.

The present invention makes use of a variety of novel features to overcome the inherent limitations of the prior art. In certain embodiments, the present invention provides for accommodation of 2/rev Coriolis torque with reduced mass and mechanical complexity as compared to previous designs.

Figure 1:
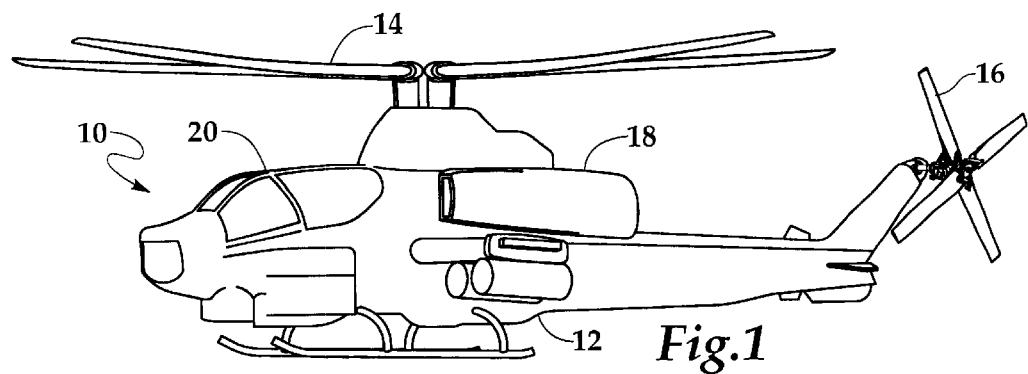
FIG. 1 is a side view of an aircraft suitable for use with certain embodiments of the present invention.

An aircraft incorporating one embodiment of the present invention is shown in FIG. 1 and generally designated 10. Aircraft 10 comprises a fuselage 12 lifted by a main rotor 14. Torque imparted to fuselage 12 by main rotor 14 is countered by tail rotor 16 mounted on the tail fin 22 of fuselage 12. Main rotor 14 and tail rotor 16 are powered by engines 18 under the control of a pilot in cockpit 20.

It will be noted that the depicted tail rotor 16 of example aircraft 10 is a "pusher" type design, wherein the tail rotor 16 is located on the left side of the aircraft 10 looking forward. This design is desirable due to the fact that, in more conventional "tractor" designs, side loading of tail fin 22 caused by the tail rotor wake has been shown to subtract significantly from available tail rotor thrust. In certain cases, research has demonstrated a net thrust loss due to the interference of tail fin 22 as high as 20%. This particular embodiment of the tail rotor 16 of the present invention, therefore, is depicted on the "pusher" side of tail fin 22, although it will be understood by one of skill in the art that the teachings of the present invention would be useful with a "tractor" style geometry. The fin-to-tail rotor separation distance has been optimized for weight, flapping clearance, and aerodynamic efficiency.

The use of a four-blade design provides lower blade loading (i.e. thrust per blade) as compared to a two-blade design, resulting in improved aerodynamic performance due to lower tip losses associated with high aspect ratio blades. This also results in reduced control loads.

Figure 2:
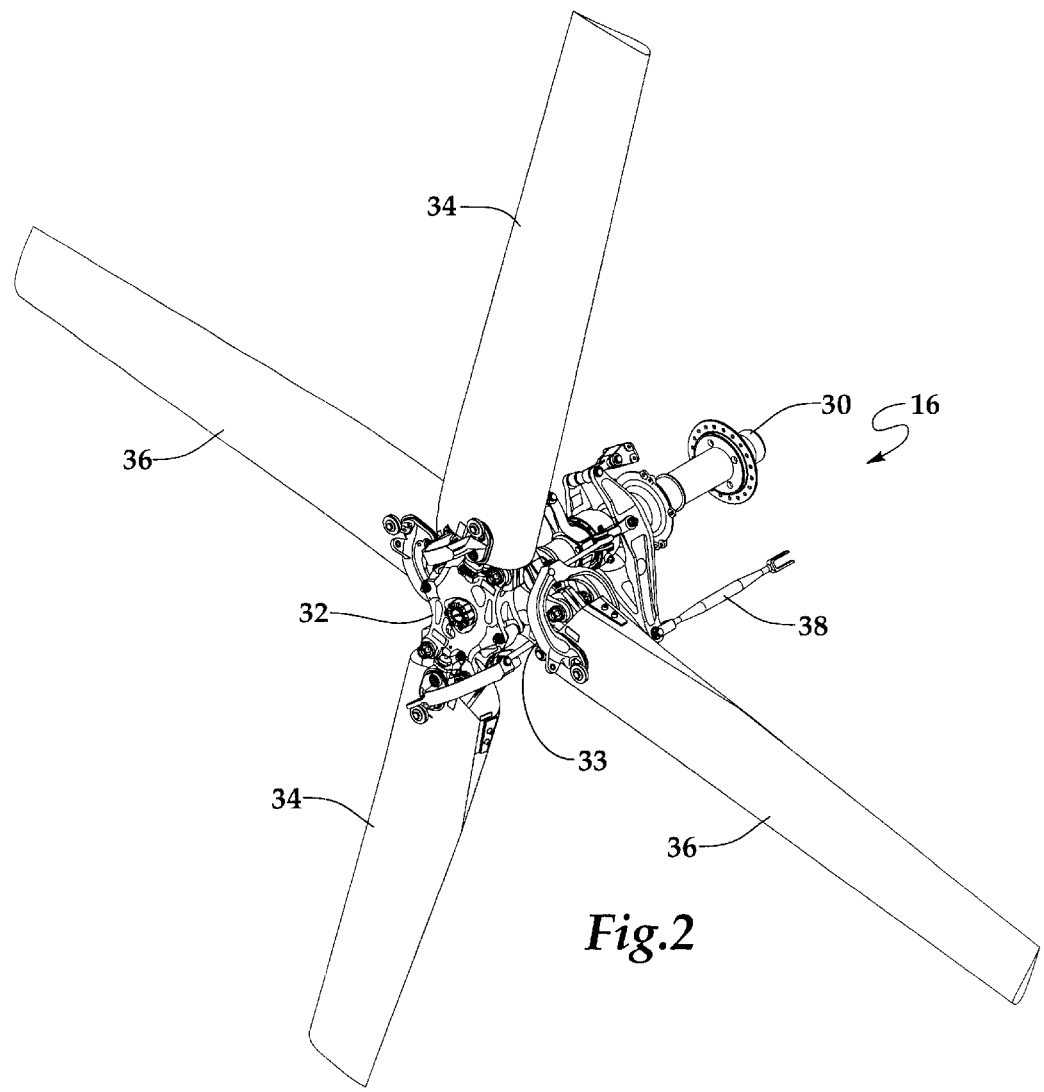
FIG. 2 is an isometric view of a tail rotor according to certain embodiments of the present invention.
Figure 3:
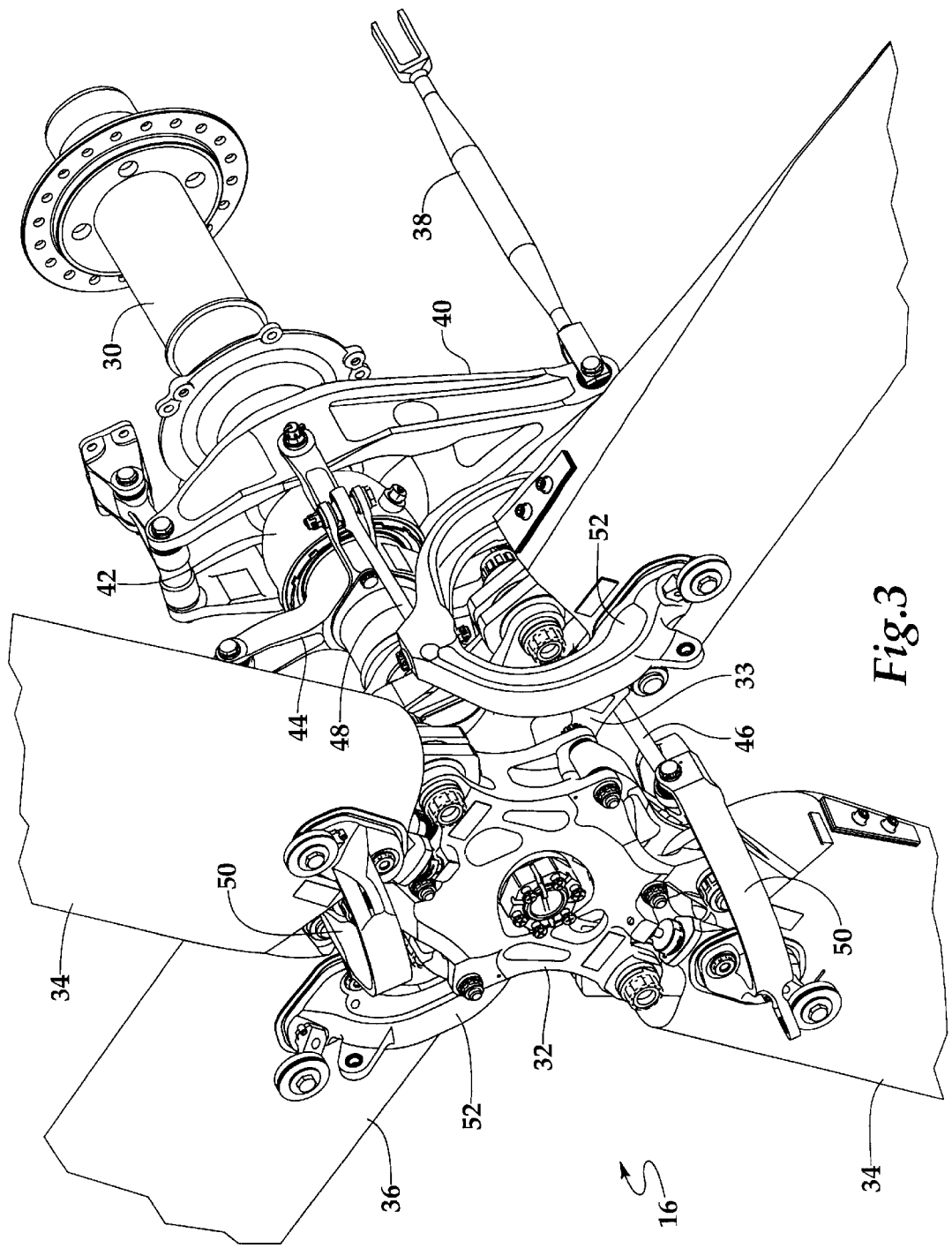
FIG. 3 is a detailed isometric view of a tail rotor hub assembly according to certain embodiments of the present invention.
Figure 4:
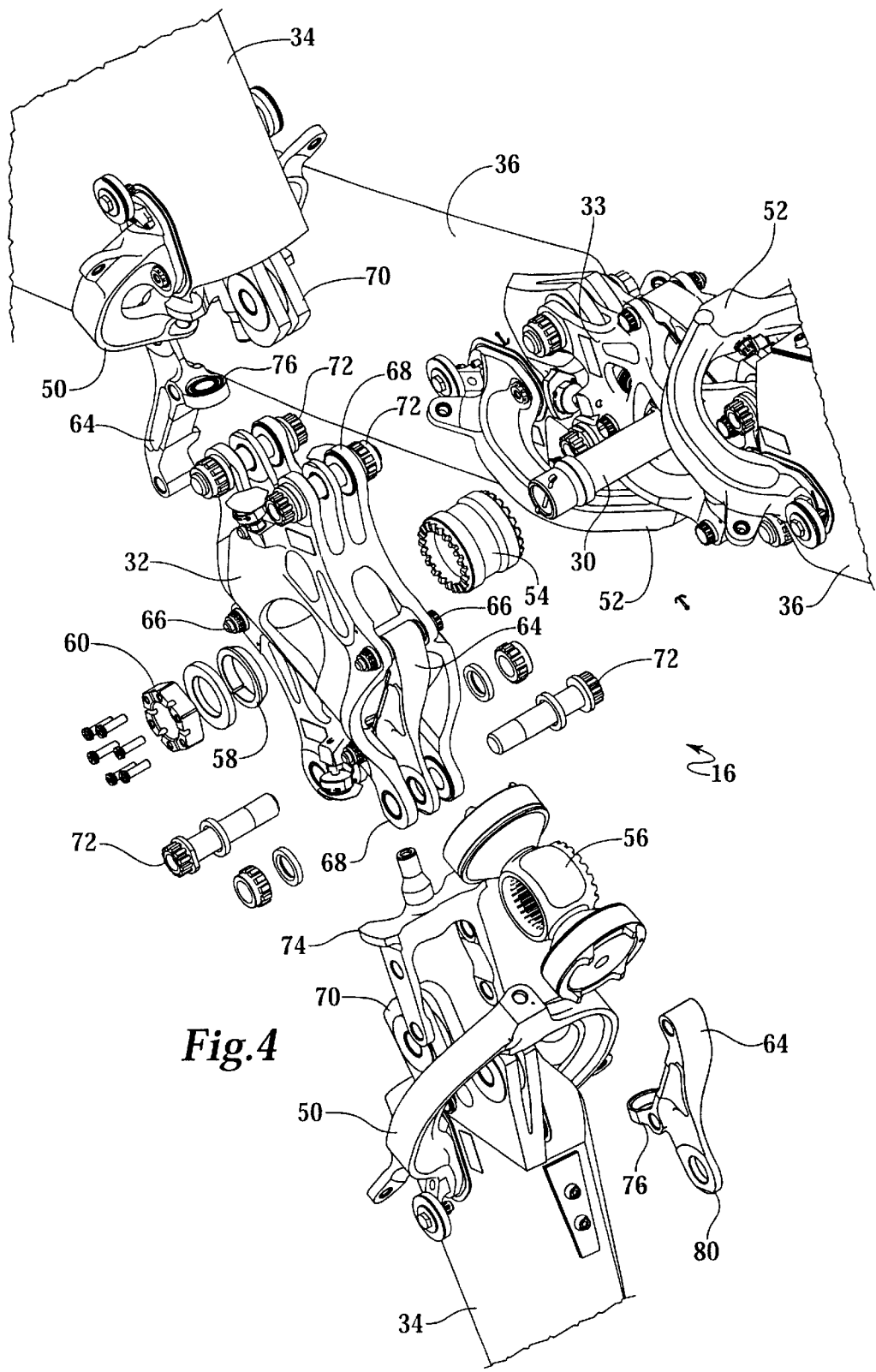
FIG. 4 is an exploded view of a tail rotor hub assembly according to certain embodiments of the present invention.

An isometric view of the tail rotor 16 of the aircraft 10 of FIG. 1 is shown in FIG. 2. A detailed view of the hub assembly of tail rotor 16 is shown in FIG. 3. An exploded view of the hub assembly of tail rotor 16 is shown in FIG. 4. As seen in FIGS. 2–4, tail rotor 16 comprises a mast 30 connected to an outboard yoke 32 and an inboard yoke 33 through trunnion/bearing assemblies 56. Outboard yoke 32 is connected to two outboard blades 34, while inboard yoke 33 is connected to two inboard blades 36.

As seen in FIGS. 2–4, the hub assembly of tail rotor 16 consists of two identical rotor assemblies, inboard and outboard, connected by a hub adapter 54 and secured to the mast 30 by mast nut 60. The outboard yoke assembly consists of a yoke 32, a trunnion and elastomeric flapping bearing assembly 56, and two retention fittings 64. In certain embodiments, the inboard yoke assembly is identical.

Each yoke assembly uses an elastomeric bearing to accommodate rotor-flapping motions. Additionally, each trunnion/bearing assembly 56 provides load paths for rotor torque and thrust. Each trunnion/bearing assembly 56 consists of two conical elastomeric/metal bearings molded to a CRES trunnion. Conventional teetering rotors that use elastomeric bearings to provide for a flapping degree of freedom require the radial stiffness of the bearings to be very high to minimize radial deflection under rotor torque.

The tail rotor 16 of the present invention provides far superior performance as compared to existing designs, particularly in regard to the handling of 2/rev Coriolis torque. In general, the known solutions for dealing with 2/rev Coriolis torque involve heavy and complex mechanisms. Some require the use of heavily-loaded bearings oscillating at tail rotor frequency, resulting in designs requiring high levels of maintenance and excessive downtime.

In certain existing designs, there are problems associated with tailoring the stiffness of critical metal parts, possibly resulting in a degraded structural design and potentially catastrophic failure modes. The tail rotor 16 of the present invention does not exhibit these problems.

The 2/rev Coriolis torque relief for the tail rotor 16 of the present invention is provided by optimizing the dynamic characteristics of the elastomeric bearings, an existing component in the system. In other words, the tail rotor 16 of the present invention uses the existing elastomeric bearings to accommodate rotor flapping, rather than introducing a separate mechanism. Conventional teetering rotors that use elastomeric bearings to provide flapping degree of freedom require the radial stiffness of the bearings to be very high in order to minimize radial deflection under rotor torque. In the design of the present invention, however, the bearing radial stiffness is tailored to provide adequate stiffness to react rotor torque and to provide adequate softness to relieve 2/rev Coriolis torque loads.

Due to the fact that the Coriolis torque relief is provided by tailoring the spring rate of an existing component necessary to accommodate the "flapping" degree of freedom, the resulting hub assembly provides a much simpler configuration having reduced weight and cost and higher reliability due to reduction in number of parts.

In certain embodiments, certain parts of the rotor assembly are designed to function as independent failsafe load paths to protect against catastrophic failure of the tail rotor 16. For example, certain embodiments of tail rotor 16 incorporate redundant load paths in the lug area of yoke 32. In certain embodiments, the yokes 32 and 33 of tail rotor 16 are designed to allow each lug 68 to function independently of the other lugs 68 as a failsafe load path. With such designs, even in the event of a complete mechanical failure of one of the lugs 68, the other lugs 68 can continue to carry loads.

In addition to the above-described structure, tail rotor 16 incorporates a shear spindle 74 bolted to the inboard end of each blade 32 to provide a blade shear load path to a bearing 76 housed in the corresponding restraint fitting 64. The shear spindle 74 incorporates coning stops to limit blade coning when the rotor 16 is not turning. The coning stops are designed to prevent damage by strong side gust winds when the aircraft 10 is parked.

In the rotor 16 shown in FIGS. 2–4, the rotating controls are oriented coaxially to the tail rotor mast 30 and are located outside of mast 30. The control system consists of a rotating crosshead 44, thrust bearing housing 41, thrust bearing 42, input lever 40, and pitch links 46 and 48. Blade pitch is controlled by the four-clevis pitch control crosshead 44 that, through four pitch links 46 and 48, transmits control inputs from the non-rotating system to the cuff-mounted "ring" shaped pitch horns 50 and 52. Thrust bearing 42, along with a system of links and levers, provides an interface between the non-rotating and rotating control system.

Figure 5A:
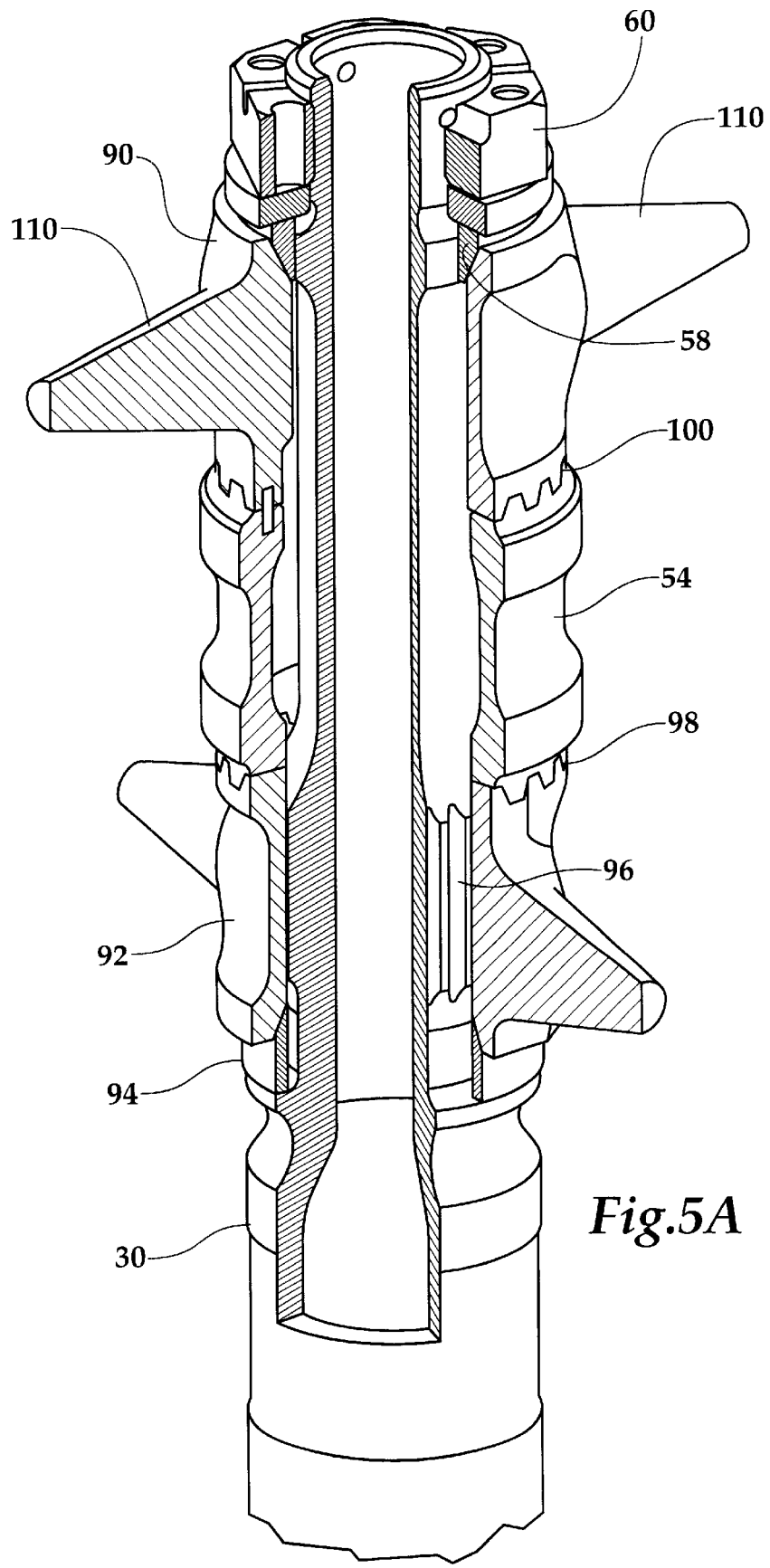
FIG. 5A is a cut-away view of a tail rotor mast and trunnion assembly according to certain embodiments of the present invention.

One embodiment of the trunnion-to-mast attachment structure of the present invention is shown in detail in FIG. 5A. The inboard trunnion 92 and outboard trunnion 90 are clamped together on the mast 30 using a pair of tapered cones 58 and 94, hub adapter 54, and mast nut 60. The tail rotor mast 30 transmits drive torque to the inboard trunnion 92 by means of a spline section 96. The inboard trunnion 92 has mating splines on its inside surface to mate with mast spline section 96, and curvic teeth on its outboard face to mate with the corresponding teeth on the hub adapter 54.

A cone set 94 between the inboard trunnion 92 and inboard shoulder of the mast 30 provides positive centering of the inboard trunnion 92 and locks out radial looseness in the spline section 96. The drive torque is transmitted to the outboard trunnion 90 from the inboard trunnion 92 through a hub adapter 54 having an inboard curvic coupling 98 mating with the inboard trunnion.92 and an outboard curvic coupling mating with the outboard trunnion 90. A second cone set 58 between the outboard trunnion 90 and the mast nut 60 provides centering of the outboard trunnion 90.

In the embodiment shown in FIG. 5A, the section of the mast outboard of the inboard trunnion 92 has a reduced outside diameter to produce a torsional stiffness significantly lower than the torsional stiffness of the hub adapter 54. Thus for any rotational deflection of the outboard trunnion 90, the mast 30 will rotate an equivalent amount with this rotation occurring in the reduced section of the mast 30 and not at the outboard cone set joint 58.

In the embodiment shown in FIG. 5A, the cones 58 and 94, trunnions 90 and 92 and hub adapter 54 slide over the tail rotor mast 30 and are sandwiched between an integral shoulder of the mast 30 and the mast nut 60. The mast nut torque produces an axial pre-load across these components. The axial pre-load generates the desirable frictional clamp up at the outboard cone 58 and counteracts separation force from the curvic coupling joints 98 and 100.

The primary purpose of the hub adapter 54 is to deliver drive torque to the outboard trunnion 90. The inboard trunnion 92 is splined to the mast 30. Accordingly, all of the steady drive torque from the mast 30 goes into the inboard trunnion 92. Approximately half of that torque goes into the inboard rotor through the inboard yoke 33. The remaining drive torque exits the inboard trunnion 92, goes through the hub adapter 54, and into the outboard trunnion 90, which drives the outboard yoke 32 and outboard blades 34. It will be noted that the outboard trunnion 90 is not splined to the mast 30. Therefore the hub adapter 54 sees about one half of the mast torque as a steady load.

The above-described structure provides a number of benefits, including reduced failure due to fretting and wear, the absence of relative motion at the attachment joints, and commonality between the inboard and outboard rotor assemblies. Since the 2/rev Coriolis torque loads between the inboard trunnion 92 and outboard trunnion 90 are reacted by the curvic couplings 98 and 100, and not the tail rotor mast spline section 96, the potential failure due to fretting is reduced. Since the two stacked rotor trunnions 90 and 92 are clamped together through curvic couplings 98 and 100, they are securely fixed to one another via a tight joint, which is desirable for minimizing the fretting and wear common to joints that see high oscillatory loads. The torsionally-soft outboard section of the mast 30 accommodates the angular deflection between the two trunnions 90 and 92 with minimal relative motion occurring at the attachment joint surfaces. Finally, this design allows for common inboard and outboard rotor assemblies, which can be assembled, replaced and shipped as individual 2-bladed assemblies.

There are at least two major design considerations in the sizing of the curvic couplings 98 and 100 of hub adapter 54. First, each of couplings 98 and 100 must be capable of reacting the steady, oscillatory, and limit torque loads imposed by the tail rotor 16. Second, it is desirable that the axial pre-load across the couplings 98 and 100 be high enough to prevent joint separation during operation. The couplings 98 and 100 and surrounding hardware (cone sets, mast nut, and mast) must also be capable of carrying the pre-load requirement. The size and pitch of the curvic couplings 98 and 100 will, of course, vary from one application to another.

Figure 5B:
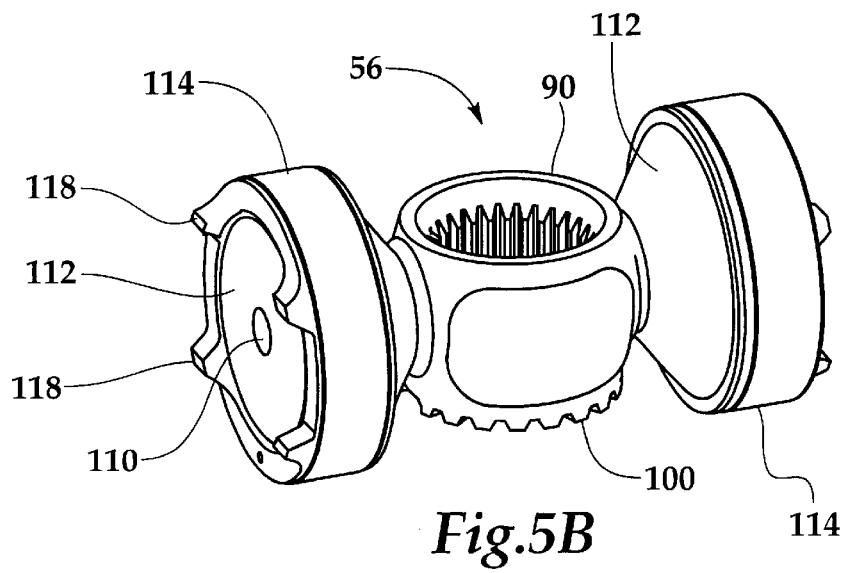
FIG. 5B is an isometric view showing a trunnion and bearing assembly according to certain embodiments of the present invention.
Figure 5C:
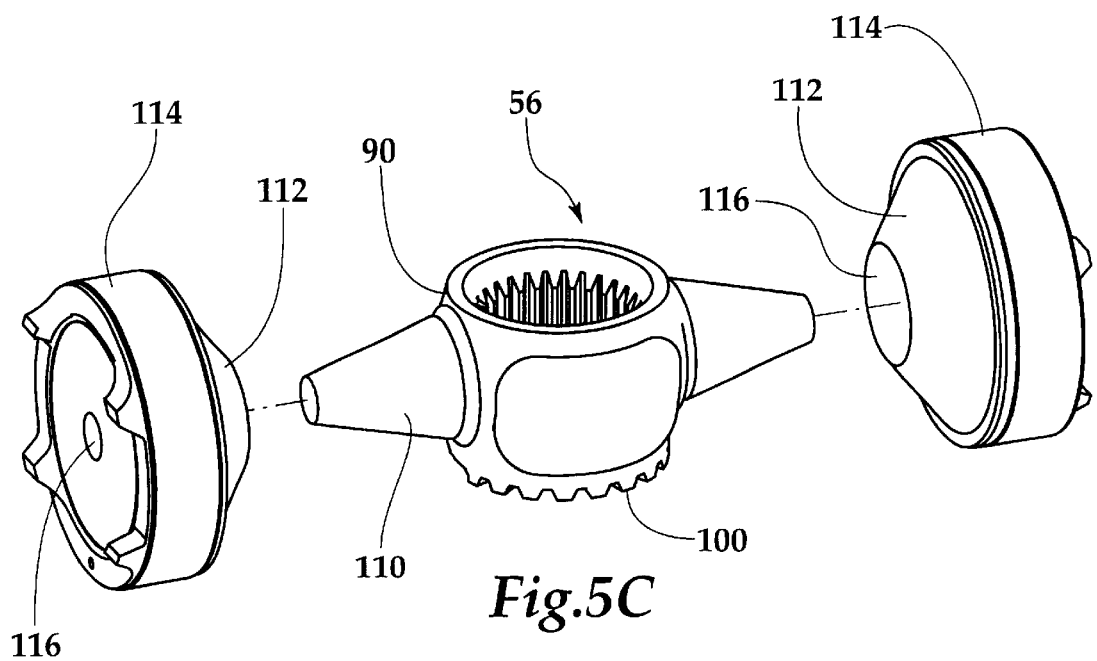
FIG. 5C is an exploded isometric view showing a trunnion and bearing assembly according to certain embodiments of the present invention.

FIGS. 5B and 5C are isometric views of an elastomeric bearing and trunnion assembly 56 according to certain embodiments of the present invention. FIG. 5B shows the bearing and trunnion assembly 56 as it appears when fully assembled, while FIG. 5C depicts the bearing and trunnion assembly 56 in an exploded representation. Bearing and trunnion assembly 56 comprises a trunnion 90 having a pair of trunnion arms 110 extending therefrom. In the embodiment shown in FIGS. 5B and 5C, trunnion arms 110 have a generally-conical shape, though other shapes will be suitable for certain applications. In certain embodiments, trunnion 90 is made of stainless steel, although other suitable materials will be known to those of skill in the art.

The outer surface of each of the trunnion arms 110 is shaped to fit securely within the inner surface 116 of an elastomeric bearing 116. In certain embodiments, the elastomeric bearings 112 are molded in place on trunnion arms 110, while alternate embodiments involve pre-molded bearings 112 bonded to the trunnion arms 110 after molding.

Disposed around each of the elastomeric bearings 112 is a ring 114. Rings 114 are designed to fit securely radially within the transverse bore 104 of a yoke 32 and are secured in place axially by a pair of retention fittings 64 disposed within each yoke at opposite ends of the transverse bore 104. In certain embodiments, rings 114 incorporate stops 118 designed to register against the edges of the retention fittings 64 to limit the radial movement of the rings 114 within the bore 104, thereby limiting the movement of the yoke 32 with respect to the mast 30.

As noted above, the 2/rev Coriolis relief for the present invention is provided by optimizing the dynamic characteristics of the elastomeric bearings 112 to accommodate rotor flapping rather than by adding additional hardware. Conventional teetering rotors that use elastomeric bearings to provide a flapping degree of freedom require the radial stiffness of the bearings to be very high in order to minimize radial deflection under rotor torque. In the design of the present invention, however, the radial stiffness of bearings 112 is tailored to provide adequate stiffness to react to rotor torque while at the same time providing adequate softness to relieve for 2/rev Coriolis loads. Since the Coriolis relief is provided by tailoring the spring rate of an existing component required to accommodate the "flapping" degree of freedom anyway, the resulting hub assembly provides a much simpler configuration with reduced weight and cost, and higher reliability due to reduction in number of parts.

FIGS. 6–9 depict principal axis views of one embodiment of outboard yoke 32. Yoke 32 transfers torque to the blades 34, reacts rotor loads, and transfers blade thrust to the mast 30 through trunnion/bearing assembly 56. In certain embodiments, yoke 32 is a titanium forging.

A unique feature of certain embodiments of yoke 32 is a set of multiple redundant load paths. Each yoke 32 has multiple lugs 68 with redundant load paths at each end. Each pair of lugs is designed to attach a blade 34 to yoke 32. As assembled, therefore, a complete outboard rotor assembly consists of a yoke 32 connected to two blades 34 separated by 180 degrees. Certain embodiments may employ alternate geometries. Each blade 34 is attached to the yoke lugs 68 with two bolts 72 in a multiple shear connection. In certain embodiments, the structure of yoke 32 inboard of the lugs 68 provides multiple load paths for structural redundancy in reacting blade-to-blade centrifugal force.

Mast 30 passes through mast bore 102. A bearing bore 104, orthogonal to mast bore 102 and indexed to the pitch change axis, houses an elastomeric flapping bearing/trunnion assembly 56. In one embodiment, the bearing bore is indexed at 40 degrees to the pitch change axis. As assembled, a restraint fitting 64 is assembled to the yoke 32 at each end of the bearing bore 104, which provides an axial pre-load across the bearing/trunnion assembly 56. As seen in FIG. 4, a restraint fitting 64 is held in place by two bolts 66 inserted in bores 78. In certain embodiments, an additional lug 80 integral to restraint fitting 64 provides one of the redundant load paths for the blade-to-yoke attachment.

In the embodiment shown in FIG. 5, there are 6 independent primary load paths. In the event of failure of any of these load paths, yoke 32 will continue to provide a high level of structural integrity in tail rotor 16. In one embodiment, a tail rotor 16 suffering complete failure of any single load path can maintain integrity for at least 6 flight, hours of an unrestricted flight spectrum, including all limit and ultimate load conditions.

Figure 10:
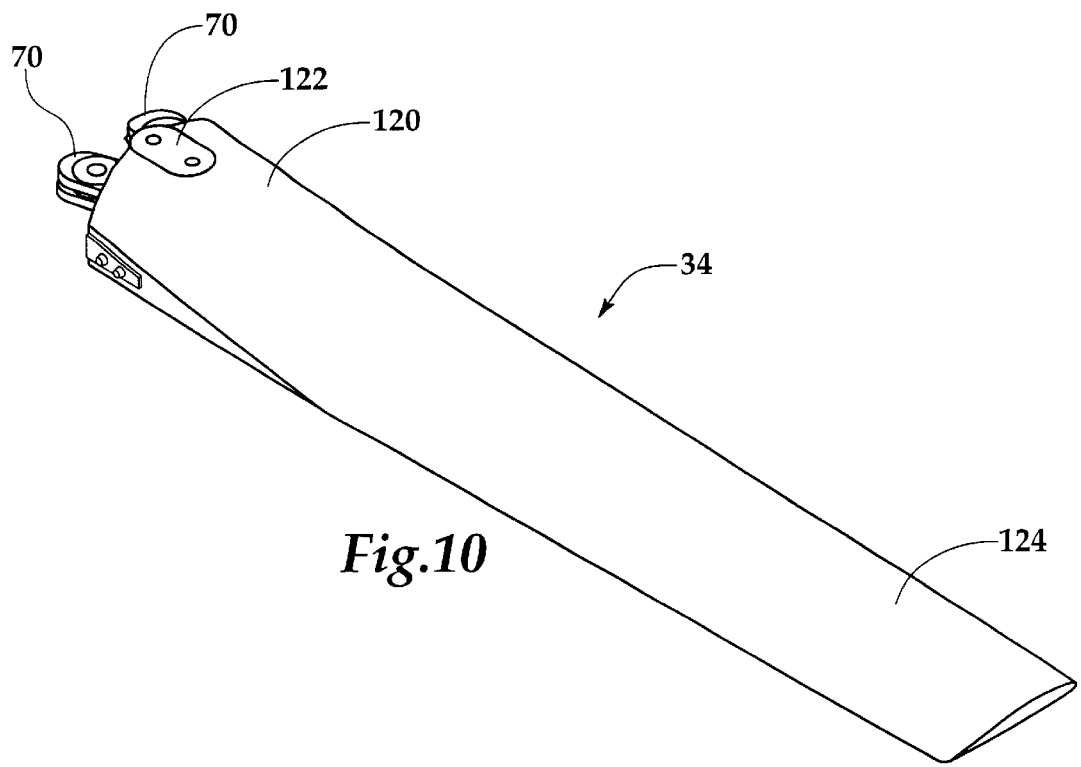
FIG. 10 is an isometric view of a rotor blade according to certain embodiments of the present invention.

An isometric view of a single rotor blade 34 of the tail rotor 16 of FIGS. 2–4 is shown in FIG. 10. Blade 34, while in certain embodiments manufactured as a single part, consists of three distinct portions. Blade 34 comprises integral cuff 120 and outboard blade section 124. An integral twist strap (not shown) within the cuff 120 functions as the main centrifugal force load path for the blade 34 and accommodates both pitch change and coning motions. The integral twist strap is rigidly bolted to yoke lugs 68 through blade lugs 70.

As described above in connection with FIGS. 2–4, integral cuff 120 interfaces with rotor yoke 32 through a shear spindle 74 bolted to its upper and lower faces at interfaces 122, and delivers control system pitch inputs to the blade 32 through a ring-shaped pitch horn 50 also mounted to the cuff 120. The outboard blade section 124 generates the aerodynamic thrust for the tail rotor blade 34. Although rotor blade 34 is shown in FIGS. 2–4 as part of a four-blade tail rotor 16, it will be understood by one of skill in the art that rotor blade 34 can be successfully employed in rotor designs having more or fewer than four blades.

Figure 11:
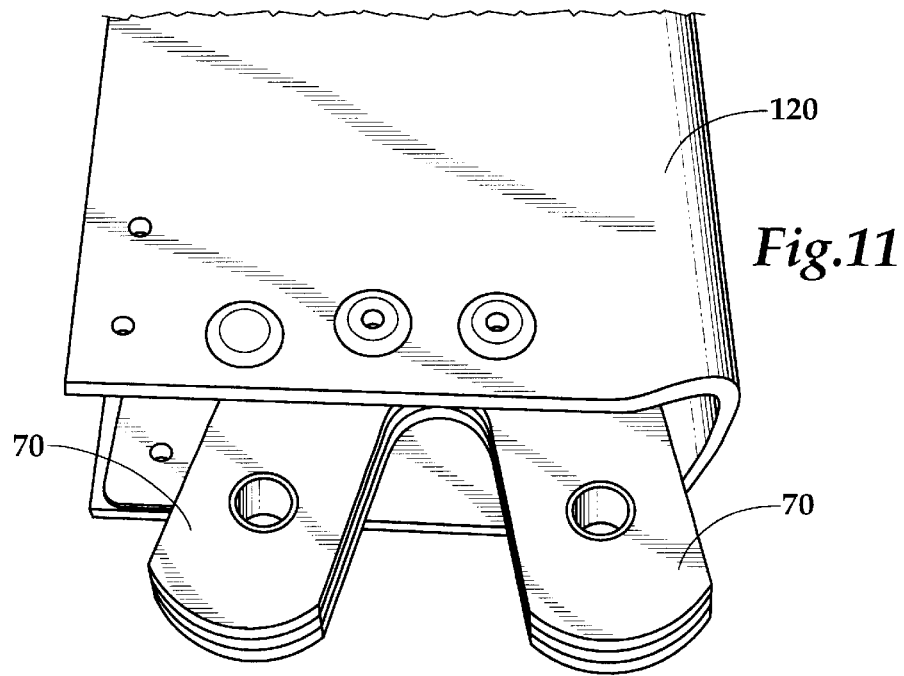
FIG. 11 is a detailed view of a rotor blade cuff according to certain embodiments of the present invention.

In certain embodiments, the cuff section 120 of blade 34, shown in FIG. 11, is a hollow airfoil shape. In one embodiment, cuff 120 is made primarily from off-axis fiberglass/epoxy tape in combination with several unidirectional layers of carbon fiber. Other constructions will be known to those of skill in the art.

The inside opening of the cuff 120 is large enough to accommodate the pitch change motion of the twist strap. The cuff 120 interfaces with the rotor yoke 32 through a shear spindle 74 bolted to its upper and lower faces, and delivers control system pitch inputs to the blade 34 through a "ring" shaped pitch horn 50. In certain embodiments, the outboard end of the cuff 120 is integral with the blade 34.

In addition to the above-described distinctions, certain embodiments of the present invention make use of a bearingless pitch mechanism for accommodation of rotor pitch. Traditional rotor assemblies differ from the design of the embodiment shown in FIGS. 2–4 in that they rely on rotary bearings between the yokes 32 and 33 and the blades 34 and 36 to accommodate the pitching motion of the blades 34 and 36 relative to the yokes 32 and 33.

In the embodiment shown in FIG. 2–4, it can be seen that blades 34 and 36 are fixed to the yokes 32 and 33, which are in turn fixed to the mast 30, with no provision within the hub assembly for accommodation of rotor blade pitch. Each rotor blade 34 and 36 incorporates an integral flexing strap, which replaces the functionality of the bearings found in traditional prior art designs by flexing about the lengthwise axis of rotor blade 16, so as to allow for adjustment of the pitch of the rotor blade 16 without pitching bearings.

In certain embodiments of the present invention, the inboard cuff 120 of the rotor blade 34 is an integral part of the structure of the rotor blade 34 itself. The inboard cuff 120 is designed to provide protection over the integral strap, to maintain the aerodynamic contour of the rotor blade 34, and to prevent contact between the integral strap and the hollow structure of the rotor blade 34 during flight. In certain embodiments, the cuff 120 is designed to be sufficiently torsionally stiff to function as the pitching mechanism transmitting pitching torque from the pitch horn 50 into the rotor blade 34.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered.

The description as set forth is not intended to be exhaustive or to limit the scope of the invention. Many modifications and variations are possible in light of the above teaching without departing from the spirit and scope of the following claims. It is contemplated that the use of the present invention can involve components having different characteristics. It is intended that the scope of the present invention be defined by the claims appended hereto, giving full cognizance to equivalents in all respects.

What is claimed is:

1. A hub-to-mast assembly for a rotor comprising:
   a rotor mast having a torsionally rigid portion and a torsionally compliant portion;
   a first hub disposed around the rotor mast in the torsionally rigid portion and torsionally coupled to the rotor mast; and
   a second hub disposed around the rotor mast in the torsionally compliant portion and torsionally coupled to the first hub.

2. A hub-to-mast assembly for a rotor comprising:
   a rotor mast having a torsionally rigid portion and a torsionally compliant portion;
   a first hub disposed around the rotor mast in the torsionally rigid portion, torsionally coupled to the rotor mast through a splined connection, and having a pair of compliant bearings disposed thereon; and
   a second hub disposed around the rotor mast in the torsionally compliant portion, torsionally coupled to the first hub through a curvic coupling, and having a pair of compliant bearings disposed thereon.

3. A hub-to-mast assembly for a rotor comprising:
   a rotor mast having a torsionally rigid portion and a torsionally compliant portion;
   a first hub disposed around the rotor mast in the torsionally rigid portion thereof, torsionally coupled to the rotor mast through a splined connection, and having a pair of rigid structures extending radially therefrom, each having a compliant bearing disposed thereon;
   a hub adapter disposed around the rotor mast adjacent to the first hub and torsionally coupled to the first hub through a curvic coupling;
   a second hub disposed around the rotor mast in the torsionally compliant portion, torsionally coupled to the hub adapter through a curvic coupling, and having a pair of rigid conic structures extending radially therefrom, each having a compliant bearing disposed thereon.

* * * * *

UNITED STATES PATENT AND TRADEMARK OFFICE
CERTIFICATE OF CORRECTION

PATENT NO.     : 6,439,849 B1                                                            Page 1 of 1
DATED          : August 27, 2002
INVENTOR(S)    : Ajay Sehgal and Glenn Shimek It is certified that error appears in the above-identified patent and that said Letters Patent is hereby corrected as shown below:

<u>Column 1,</u>
Line 3, please insert the following:
-- Government License Rights
The U.S. Government has a paid-up license in this invention and the right in limited circumstances to require the patent owner to license others on reasonable terms as provided for by the terms of Contract No. N00019-96-C-0128 awarded by NAVAIR. --

Signed and Sealed this

Thirtieth Day of December, 2003

JAMES E. ROGAN
*Director of the United States Patent and Trademark Office*